Patented Aug. 21, 1945

2,383,110

UNITED STATES PATENT OFFICE 2,383,110

SPONGE RUBBER PRODUCTS

Alfred Cooper, Croydon, England, assignor to Rubatex Products, Inc., New York, N. Y., a corporation of Delaware No Drawing. Application March 4, 1943, Serial No. 477,991. In Great Britain April 29, 1941

1 Claim. (Cl. 260—722)

This invention relates to improved microporous rubber products and novel processes for making the same.

In the manufacture of sponge rubber, it has been known that admixing a chemical blowing agent with the rubber mix will, if properly controlled, generate a gas which will expand the rubber and produce an expanded porous rubber composition. Such an expanded cellular rubber or sponge rubber, as it is known, cannot however be well controlled so as to produce a product of consistent weight per unit volume and moreover, the fineness of the cellular structure which determines the quality of the product is very much restricted so that a fine cellular product of low specific gravity cannot be so readily produced by this process.

I have discovered that by controlling the expansion of the gas generated by the chemical blowing agent in a manner first to make a cell tight product, I can thereafter either by chemical or mechanical action control the rupture of the cells to produce a sponge rubber of finer or microscopic porous structure.

Accordingly, an object of my invention is to produce a novel sponge rubber product.

A further object of my invention is to provide a novel process for manufacturing sponge rubber.

Still another object of my invention is to provide a novel process which comprises first manufacturing cell tight rubber, from which a sponge rubber is produced.

There are other objects of my invention which, together with the foregoing, will appear in the detailed description which is to follow.

In carrying out my invention, I first treat a rubber mix in its unvulcanized state with a gas generating composition which forms gas on heating the rubber just at or before vulcanization occurs.

During the heat treatment, the rubber is suitably restricted against expansion until it is sufficiently vulcanized to retain the gas being generated by the heat treatment. On release, the rubber then expands under the action of the gas and the further heat treatment completes the vulcanization of the rubber. Escape of gas is prevented by such vulcanization and the final expanded product is in the form of minute sealed cells.

The production of such a product is fully described in the patent to Roberts et al., No. 2,299,593, dated October 20, 1942. After the sealed cellular gas expanded product is produced in the manner described above, I first remove the hard skin which normally forms on the outer layer and which is non-cellular in structure.

This external skin may be removed by any well known process, such as by plane, band saw, band knife, sandpapering or by a slicing machine. The skinned material is then sliced or cut to produce the desired thickness and external configuration.

Several means may then be employed for bursting the cells of this cell tight structure. In one such method, the skinned sheets are immersed in boiling water until the sealed cells burst. Each cell then contains a minute slit or hole which enables the structure to absorb water.

I have found that carrying on the boiling for a period of from 1 to 6 hours depending on the thickness of the material is sufficient to burst the cells. By this process the cells burst outwardly. The sponge rubber product is then laid out flat and permitted to dry.

In another form of bursting the cells, the sheets are placed in a tank which is sealed by a screwed on or bolted cover which is filled with water. Pressure is applied and adjusted by means of a valve and pressure gauge. The material is subjected to treatment under pressure of 15 pounds per square inch for about 24 hours at atmospheric temperature or for about 12 hours under a pressure of about 30 pounds per square inch. The effect of this hydraulic pressure causes the cells to burst inwardly, thereby forming a sponge product.

In still another process I secure a porous material by treatment with a solvent for one of the ingredients of the rubber composition. In this form, the original mix before the production of the closed cell gas expanded rubber has incorporated with it an acid soluble material, such as whiting or light magnesium carbonate in proportions of from 50 to 150 per cent of the rubber employed. The rubber mix in fact should be overloaded with this special mix.

The closed cell material obtained with this mix is treated at atmospheric pressure with dilute acid such as 10% hydrochloric acid for several days or by heating from 12 to 24 hours after the skin has been removed and the sheets have been cut in the manner described above.

Still a further method of obtaining sponge rubber is to introduce in the original mix a water soluble material such as ammonium chloride, ammonium nitrate or potassium thiosulphate.

The gas expanded cell tight rubber is then treated with cold or hot water for 24 to 48 hours.

In all of the examples above, the extent of treatment will, as should now be understood, vary in time in accordance with the thickness of the material.

It will further be understood that the boiling step described in the first process or the hydraulic pressure described in the second process may be combined with the chemical treatment of the last two described processes; that is to say, in carrying out either the chemical step of dissolving by means of hydrochloric acid or by hot water, pressure may be applied to the cold acid or water respectively or boiling may be resorted to.

Although in the example given above, the sulphur content of the rubber mix may be such as to produce a hard cell tight structure, the same process may be applied in the manufacture of soft gas expanded rubber by merely controlling the sulphur composition—reducing it to the necessary proportion.

My invention is specifically applicable to the manufacture of microporous rubber materials which may be applicable, when sliced sufficiently thin, to act as separators for electric storage batteries; electrolytic cells, filter diaphragms, porous cups and sheets, tubing and other similar porous articles.

Although the invention is described in connection with a chemical blowing agent for producing a gas expanded cell structure, it is equally applicable to cases where the gas expanded cellular structure is produced by an external blowing agent, such as by applying gas under pressures of the order of 2,000 pounds per square inch as described in the Denton Reissue Patent No. 21,245 or Patent No. 2,110,400. As will be understood, any well-known method of making a gas expanded cell-tight structure may be employed as the first step of my novel process for manufacturing sponge rubber.

Moreover, while my invention has been described in connection with rubber, it will be apparent that it may be applied to any synthetic rubber composition or any plastic composition which has the characteristics necessary for the production of a gas expanded cell tight product.

Accordingly, I do not wish to be limited by the specific illustration which I have chosen to describe my invention, but only as set forth in the appended claim.

I claim:

The process of manufacturing porous expanded rubber products which comprises first producing a vulcanized gas expanded cell tight structure; cutting the gas expanded cell tight structure to the desired final shape of any desired article, and thereafter submerging the vulcanized gas expanded cell-tight structure in boiling water and maintaining the water boiling until the cells become inter-communicating.

ALFRED COOPER.